(12) United States Patent
Nakagawa et al.

(10) Patent No.: US 9,987,586 B2
(45) Date of Patent: Jun. 5, 2018

(54) $CO_2$ RECOVERY UNIT AND $CO_2$ RECOVERY METHOD

(71) Applicant: MITSUBISHI HEAVY INDUSTRIES, LTD., Tokyo (JP)

(72) Inventors: Yosuke Nakagawa, Tokyo (JP); Daisuke Shimada, Tokyo (JP); Tatsuya Tsujiuchi, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days. days.

(21) Appl. No.: 15/397,373

(22) Filed: Jan. 3, 2017

(65) Prior Publication Data

US 2017/0113177 A1   Apr. 27, 2017

Related U.S. Application Data

(63) Continuation of application No. PCT/JP2015/067751, filed on Jun. 19, 2015.

(30) Foreign Application Priority Data

Jul. 10, 2014  (JP) .................................. 2014-142555

(51) Int. Cl.
*B01D 53/14* (2006.01)
*B01D 53/18* (2006.01)
(Continued)

(52) U.S. Cl.
CPC ..... *B01D 53/1412* (2013.01); *B01D 53/1425* (2013.01); *B01D 53/1475* (2013.01);
(Continued)

(58) Field of Classification Search
CPC .. B01D 2252/20478; B01D 2258/0283; B01D 53/1412; B01D 53/1425;
(Continued)

(56) References Cited

U.S. PATENT DOCUMENTS

2010/0319531 A1   12/2010   Iijima et al.
2012/0167760 A1   7/2012   Muraoka et al.
(Continued)

FOREIGN PATENT DOCUMENTS

| EP | 2 821 121 A1 | 1/2015 |
|---|---|---|
| JP | 2011-000527 A | 1/2011 |

(Continued)

OTHER PUBLICATIONS

Extended European Search Report in counterpart European Application No. 15 81 8919.1 dated May 11, 2017 (9 pages).
(Continued)

*Primary Examiner* — Cabrena Holecek
(74) *Attorney, Agent, or Firm* — Osha Liang LLP

(57) ABSTRACT

A $CO_2$ recovery unit includes a $CO_2$-absorber that causes a gas containing $CO_2$ to contact a $CO_2$-absorbing solution and that causes the $CO_2$ in the gas to be absorbed into the $CO_2$-absorbing solution; a $CO_2$-regenerator that heats the $CO_2$-absorbing solution, releases the $CO_2$ from the $CO_2$-absorbing solution, and regenerates the $CO_2$-absorbing solution; and a $CO_2$ recovery amount controller that: calculates a computed target value of a $CO_2$ recovery amount and a computed target value of a $CO_2$ recovery rate based on a set value of the $CO_2$ recovery rate, actual measured values of $CO_2$ concentration, gas flow rate, and temperature of the gas, and calculates a maximum value of the $CO_2$ recovery amount in the $CO_2$-absorber and a maximum value of the $CO_2$ recovery amount in the $CO_2$-regenerator.

8 Claims, 2 Drawing Sheets

(51) Int. Cl.
    *B01D 53/34* (2006.01)
    *B01D 53/62* (2006.01)
    *B01D 53/78* (2006.01)
    *C01B 31/20* (2006.01)
(52) U.S. Cl.
    CPC ........... *B01D 53/18* (2013.01); *B01D 53/346* (2013.01); *B01D 53/62* (2013.01); *B01D 53/78* (2013.01); *C01B 31/20* (2013.01); *B01D 2252/20478* (2013.01); *B01D 2258/0283* (2013.01)
(58) Field of Classification Search
    CPC .. B01D 53/1475; B01D 53/18; B01D 53/346; B01D 53/62; B01D 53/78; C01B 31/20
    See application file for complete search history.

(56) References Cited

U.S. PATENT DOCUMENTS

| | | |
|---|---|---|
| 2012/0245737 A1 | 9/2012 | Liu et al. |
| 2014/0086811 A1 | 3/2014 | Saito et al. |
| 2014/0373720 A1* | 12/2014 | Nakagawa ......... B01D 53/1412 96/234 |

FOREIGN PATENT DOCUMENTS

| | | |
|---|---|---|
| JP | 2011-057485 A | 3/2011 |
| JP | 2012-035214 A | 2/2012 |
| JP | 2012-152731 A | 8/2012 |
| JP | 5237204 B2 | 7/2013 |
| JP | 2013-158685 A | 8/2013 |
| JP | 2014-004525 A | 1/2014 |
| WO | 2013/114488 A1 | 8/2013 |

OTHER PUBLICATIONS

International Search Report issued in corresponding International Application No. PCT/JP2015/067751 dated Sep. 8, 2015, and English translation thereof (6 pages).
Written Opinion issued in corresponding International Application No. PCT/JP2015/067751 dated Sep. 8, 2015 (4 pages).
English translation of a Written Opinion dated Sep. 8, 2015, issued by the International Bureau of WIPO, in related International Application No. PCT/JP2015/067751 (5 pages).

* cited by examiner

CO₂ RECOVERY UNIT AND CO₂ RECOVERY METHOD

TECHNICAL FIELD

The present invention relates to a $CO_2$ recovery unit and a $CO_2$ recovery method, for example, a $CO_2$ recovery unit and a $CO_2$ recovery method that recover $CO_2$ in a gas to be treated, using a $CO_2$-absorbing solution.

BACKGROUND

In the related art, $CO_2$ recovery units that recover $CO_2$ exhausted from boilers or the like of thermoelectric power plants are suggested (for example, refer to PTL 1). In the $CO_2$ recovery units, flue gas is introduced into a $CO_2$-absorber, a $CO_2$-absorbing solution is brought into contact with $CO_2$ included in the flue gas so that $CO_2$ is made to be absorbed thereinto. The $CO_2$-absorbing solution that has absorbed $CO_2$ is sent to a $CO_2$-regenerator and is decarboxylated with heating by a regeneration heater that regenerates the $CO_2$-absorbing solution, and thereby, a high-concentration $CO_2$ gas is recovered. The $CO_2$-absorbing solution after the decarboxylation is supplied to the $CO_2$-absorber by a liquid feed pump, and the $CO_2$-absorbing solution is circulated and used between the $CO_2$-absorber and the $CO_2$-regenerator.

CITATION LIST

Patent Literature

[PTL 1] Japanese Patent No. 5237204

SUMMARY

Meanwhile, in a $CO_2$ recovery unit described in PTL 1, operation is performed in a state where a constant $CO_2$ recovery rate is maintained by adjusting the $CO_2$-absorbing solution to be supplied to the $CO_2$-absorber and the flow rate of saturated steam to be supplied to a regeneration heater of the $CO_2$-regenerator, based on the gas flow rate of the flue gas, the introduction temperature of the flue gas, or the like. However, in a case where such control is performed, a control in which the $CO_2$ recovery unit operates in a state where the constant $CO_2$ recovery rate is maintained even if the $CO_2$ concentration in the flue gas and the gas flow rate of the flue gas have increased is performed. Thus, for example, the load of the $CO_2$ recovery unit may increase if there are restrictions or the like to the amount of steam used in the $CO_2$ recovery unit.

One or more embodiments of the invention provide a $CO_2$ recovery unit and a $CO_2$ recovery method that enable stable operation to continue even if operation conditions have changed.

A $CO_2$ recovery unit in accordance with one or more embodiments includes a $CO_2$-absorber that brings a gas (i.e., gas to be treated) and a $CO_2$-absorbing solution into contact with each other to cause $CO_2$ included in the gas to be absorbed into the $CO_2$-absorbing solution; a $CO_2$-regenerator that heats the $CO_2$-absorbing solution which has absorbed $CO_2$, releases $CO_2$ from the $CO_2$-absorbing solution, and regenerates the $CO_2$-absorbing solution; and a $CO_2$ recovery amount controller ("controller" used interchangeably with "control unit") that calculates a computed target value of a $CO_2$ recovery amount and a computed target value of a $CO_2$ recovery rate based on a set value of the $CO_2$ recovery rate, actual measured values of $CO_2$ concentration, gas flow rate, and temperature of the gas, and maximum values of the $CO_2$ recovery amounts in the $CO_2$ absorber and the $CO_2$-regenerator and that controls the amount of the $CO_2$-absorbing solution supplied to the $CO_2$-absorber, the amount of the $CO_2$-absorbing solution supplied to the $CO_2$-regenerator and the amount of saturated steam supplied to a regeneration heater of the $CO_2$-regenerator, based on the set value of the $CO_2$ recovery rate or the computed target value of the $CO_2$ recovery rate.

According to this $CO_2$ recovery unit, the circulation amount of the $CO_2$-absorbing solution and the amount of the saturated steam supplied to the regeneration heater can be appropriately controlled according to changes in the actual measured values of the $CO_2$ recovery rate and the $CO_2$ recovery amount in the gas. Accordingly, even when there is an influence on a predetermined relational expression to be used for control and the precision of a measuring instrument due to changes in operation conditions and the measuring instrument, the $CO_2$ recovery unit that can control the $CO_2$ recovery amount and/or the $CO_2$ recovery rate to a target value with high precision can be realized.

In the $CO_2$ recovery unit, the $CO_2$ recovery amount controller may calculate the computed target value of the $CO_2$ recovery rate based on the following Formulas (1) to (3).

$$Y1 = X1 \times X2 \times X3 \times \alpha \qquad \text{Formula (1)}$$

$$Y2 = \min(X4, Y1) \qquad \text{Formula (2)}$$

$$Y3 = Y2/(X2 \times X3 \times \alpha) \qquad \text{Formula (3)}$$

(In Formulas (1) to (3), X1 represents the set value of the $CO_2$ recovery rate, X2 represents an actual measured value of the $CO_2$ concentration of the gas, X3 represents an actual measured value of the gas flow rate of the gas, X4 represents a maximum value of the $CO_2$ recovery amount, Y1 represents a target value of the $CO_2$ recovery amount, Y2 represents a computed target value of the $CO_2$ recovery amount, Y3 represents a computed target value of the $CO_2$ recovery rate, and $\alpha$ represents a conversion factor).

In the $CO_2$ recovery unit, the $CO_2$ recovery amount controller may calculate the computed target value of the $CO_2$ recovery rate based on the maximum value of the $CO_2$ recovery amount when (i.e., in a case where) a target value of the $CO_2$ recovery amount exceeds the maximum value of the $CO_2$ recovery amount, and may calculate the computed target value of the $CO_2$ recovery rate based on the calculated target value of the $CO_2$ recovery amount when the target value of the $CO_2$ recovery amount is equal to or lower than the maximum value of the $CO_2$ recovery amount.

In the $CO_2$ recovery unit, the $CO_2$ recovery amount controller may calculate the computed target value of the $CO_2$ recovery amount based on threshold values when the actual measured values of the gas flow rate, $CO_2$ concentration, and temperature of the gas exceed predetermined threshold values.

In the $CO_2$ recovery unit, the $CO_2$ recovery amount controller may feedback-control the operation of the overall device using the computed target value of the $CO_2$ recovery amount.

A $CO_2$ recovery method in accordance with one or more embodiments includes a process of bringing a gas (i.e., gas to be treated) and a $CO_2$-absorbing solution into contact with each other to cause $CO_2$ included in the gas to be absorbed into the $CO_2$-absorbing solution in a $CO_2$-absorber; and a process of heating the $CO_2$-absorbing solution which has absorbed $CO_2$, releasing $CO_2$ from the $CO_2$-absorbing solution, and regenerating the $CO_2$-absorbing solution in a $CO_2$-regenerator. A computed target value of a $CO_2$ recovery amount and a computed target value of a $CO_2$ recovery rate are calculated based on a set value of the $CO_2$ recovery rate, actual measured values of $CO_2$ concentration, gas flow rate, and temperature of the gas, and maximum values of the $CO_2$ recovery amounts in the $CO_2$-absorber and the $CO_2$-regenerator, and the amount of the $CO_2$-absorbing solution supplied to the $CO_2$-absorber, the amount of the $CO_2$-absorbing solution supplied to the $CO_2$-regenerator, and the amount of saturated steam supplied to a regeneration heater of the $CO_2$-regenerator are controlled based on the set value of the $CO_2$ recovery rate or the computed target value of the $CO_2$ recovery rate.

According to this $CO_2$ recovery method, the circulation amount of the $CO_2$-absorbing solution and the amount of the saturated steam supplied to the regeneration heater can be appropriately controlled according to changes in the actual measured values of the $CO_2$ recovery rate and the $CO_2$ recovery amount in the gas. Accordingly, even when there is an influence on a predetermined relational expression to be used for control and the precision of a measuring instrument due to changes in operation conditions and the measuring instrument, the $CO_2$ recovery method that can control the $CO_2$ recovery amount and/or the $CO_2$ recovery rate to a target value with high precision can be realized.

In the $CO_2$ recovery method, the computed target value of the $CO_2$ recovery rate may be calculated based on the following Formulas (1) to (3).

$$Y1 = X1 \times X2 \times X3 \times \alpha \qquad \text{Formula (1)}$$

$$Y2 = \min(X4, Y1) \qquad \text{Formula (2)}$$

$$Y3 = Y2/(X2 \times X3 \times \alpha) \qquad \text{Formula (3)}$$

(In Formulas (1) to (3), X1 represents the set value of the $CO_2$ recovery rate, X2 represents an actual measured value of the $CO_2$ concentration of the gas, X3 represents an actual measured value of the gas flow rate of the gas, X4 represents a maximum value of the $CO_2$ recovery amount, Y1 represents a target value of the $CO_2$ recovery amount, Y2 represents a computed target value of the $CO_2$ recovery amount, Y3 represents a computed target value of the $CO_2$ recovery rate, and a represents a conversion factor).

In the $CO_2$ recovery method, the computed target value of the $CO_2$ recovery rate may be calculated based on a maximum value of the $CO_2$ recovery amount when a target value of the $CO_2$ recovery amount exceeds a maximum value of the $CO_2$ recovery amount, and may be calculated based on the target value of the $CO_2$ recovery amount when the target value of the $CO_2$ recovery amount is equal to or lower than the maximum value of the $CO_2$ recovery amount.

In the $CO_2$ recovery method, the computed target value of the $CO_2$ recovery amount may be calculated based on threshold values when the actual measured values of the gas flow rate, $CO_2$ concentration, and temperature of the gas exceed predetermined threshold values.

In the $CO_2$ recovery method, the operation of the overall device may be feedback-controlled using the computed target value of the $CO_2$ recovery amount.

Accordingly, a $CO_2$ recovery unit and a $CO_2$ recovery method in accordance with one or more embodiments enable stable operation to continue even if operation conditions have changed can be realized.

DESCRIPTION OF EMBODIMENTS

The present inventors have noted that, in a related-art $CO_2$ recovery unit that operates in a state where a constant $CO_2$ recovery rate is maintained, a control in which the $CO_2$ recovery unit operates in a state where the constant $CO_2$ recovery rate is maintained even if the $CO_2$ concentration in a gas to be treated and the gas flow rate of flue gas have increased may be performed, and the load of the $CO_2$ recovery unit may increase. The present inventors also have found out that $CO_2$ recovery amount calculated using a gas flowmeter and a gas concentration meter is controlled such that the $CO_2$ recovery amount becomes equal to or lower than a reference value, so that an increase in the load of the $CO_2$ recovery unit can be prevented even when operation conditions have fluctuated.

Hereinafter, embodiments of the invention will be described in detail with reference to the accompanying drawings. However, the invention is not limited to the following embodiments, and can be appropriately changed and carried out. Additionally, the configuration of the following $CO_2$ recovery unit can be appropriately combined and carried out.

Figure 1:
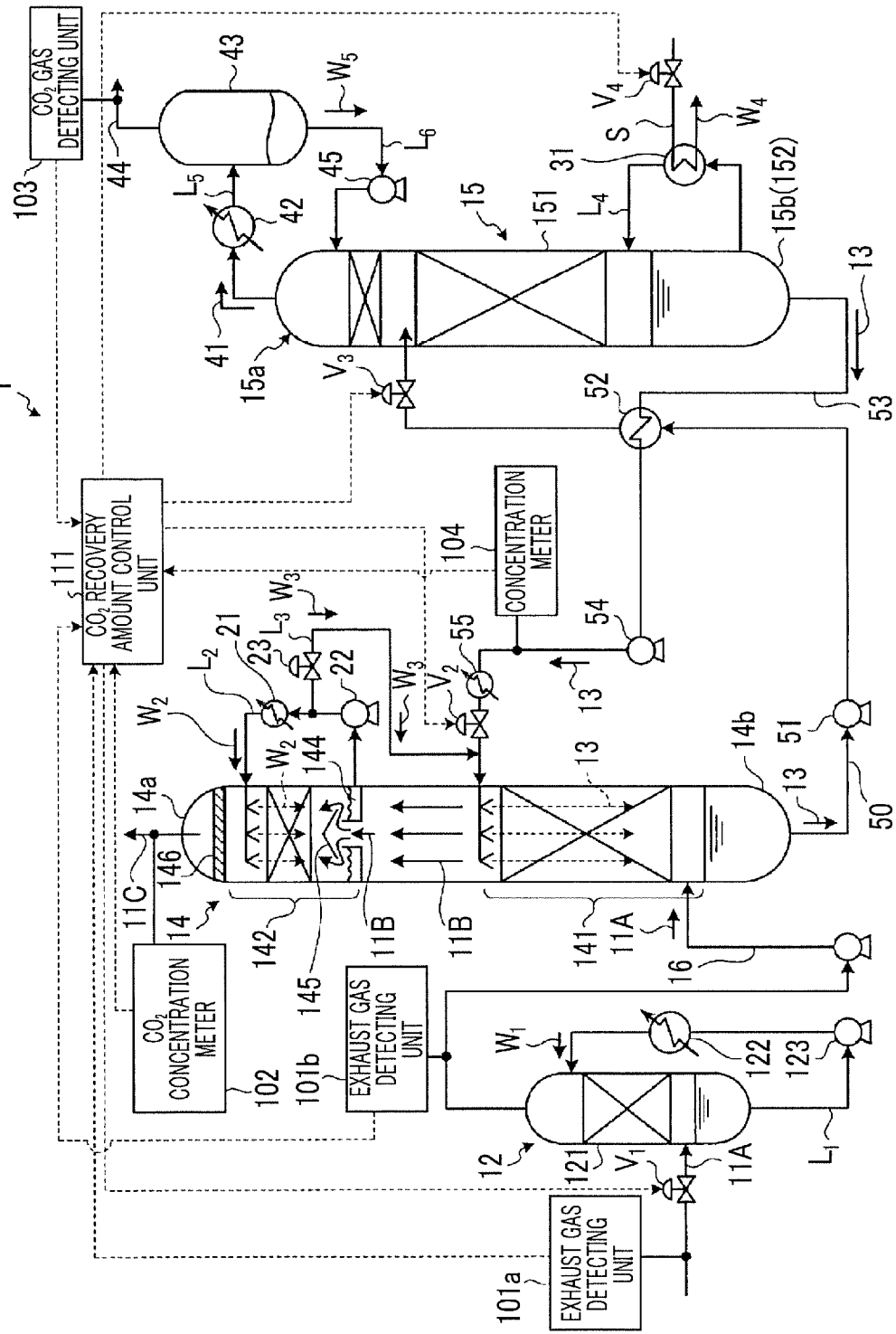
FIG. 1 is a schematic view of a $CO_2$ recovery unit in accordance with one or more embodiments of the invention.

FIG. 1 is a schematic view of a $CO_2$ recovery unit in accordance with one or more embodiments of the invention. As illustrated in FIG. 1, a $CO_2$ recovery unit 1 is an device that absorbs $CO_2$ in flue gas (an example of a gas to be treated) 11A containing $CO_2$ exhausted from industrial facilities, such as a boiler and a gas turbine, and recovers a high-concentration $CO_2$ gas. The $CO_2$ recovery unit 1 includes a quencher 12 that cools the flue gas 11A containing $CO_2$ exhausted from industrial facilities, such as a boiler and a gas turbine; a $CO_2$-absorber 14 that is provided in a subsequent stage of the quencher 12, brings the cooled flue gas 11A into contact with a $CO_2$-absorbing solution 13, and makes the $CO_2$-absorbing solution 13 absorb and remove $CO_2$ in the flue gas 11A; and a $CO_2$-regenerator 15 that is provided in the subsequent stage of the $CO_2$-absorber 14, releases $CO_2$ from the $CO_2$-absorbing solution 13 that has absorbed the $CO_2$, and regenerates the $CO_2$-absorbing solution 13.

In the $CO_2$ recovery unit 1, the $CO_2$-absorbing solution 13 circulates between the $CO_2$-absorber 14 and the $CO_2$-regenerator 15. The $CO_2$-absorbing solution 13 (lean solution) absorbs $CO_2$ in the $CO_2$-absorber 14, and is supplied to the $CO_2$-regenerator 15 as the $CO_2$-absorbing solution 13 (rich solution). Additionally, the $CO_2$-absorbing solution 13 (rich solution) has substantially all $CO_2$ removed and regenerated in the $CO_2$-regenerator 15, and is supplied to the $CO_2$-absorber 14 as the $CO_2$-absorbing solution 13 (lean solution).

The quencher 12 has a quenching section 121 that cools the flue gas 11A. A circulation line L1 is provided between a bottom part of the quencher 12 and a top part of the quenching section 121. A heat exchanger 122 that cools cooling water W1, and a circulation pump 123 that circulate the cooling water W1 within the circulation line L1 are provided in the circulation line L1.

In the quenching section 121, the flue gas 11A is cooled by bringing the flue gas 11A into countercurrent contact with the cooling water W1. The heat exchanger 122 cools the cooling water W1 heated by the heat exchange with the flue gas 11A. The circulation pump 123 supplies the cooling water W1, which has flowed down to the bottom part of the quencher 12, to the top part of the quenching section 121 via the heat exchanger 122.

The $CO_2$-absorber 14 includes a $CO_2$ absorption section 141 that is provided on a lower part side of the $CO_2$-absorber 14 and has the flue gas 11A cooled in the quencher 12 supplied thereto, a washing section 142 that is provided on an upper part side of the $CO_2$-absorber 14. A liquid storage section 144 that stores cleaning water W2 for cleaning a flue gas 11B from which $CO_2$ has been removed is provided at a bottom part of the washing section 142. A circulation line L2, through which the cleaning water W2, containing the $CO_2$-absorbing solution 13 recovered in the liquid storage section 144, is supplied and circulated from a top part side of the washing section 142, is provided between the liquid storage section 144 and an upper part of the washing section 142. The circulation line L2 is provided with a heat exchanger 21 that cools the cleaning water W2, and a circulation pump 22 that circulates the cleaning water W2, containing the $CO_2$-absorbing solution 13 recovered in the liquid storage section 144, within the circulation line L2 via the heat exchanger 21. Additionally, the circulation line L2 is provided with an extraction line L3 through which a portion of the cleaning water W2 (cleaning water W3) is extracted and supplied to the $CO_2$ absorption section 141. The extraction line L3 is provided with a control valve 23 that adjusts the amount of supply of cleaning water W3 supplied to the $CO_2$-absorbing solution 13 (lean solution).

In the $CO_2$ absorption section 141, the flue gas 11A containing $CO_2$ and the $CO_2$-absorbing solution 13 containing alkanolamine or the like come into countercurrent contact with each other. Accordingly, $CO_2$ in the flue gas 11A is absorbed by the $CO_2$-absorbing solution 13 through a chemical reaction shown in the following reaction formula. As a result, the flue gas 11A containing $CO_2$ becomes the flue gas 11B from which $CO_2$ has been removed by passing through the $CO_2$ absorption section 141.

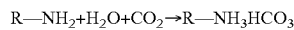

$$R-NH_2 + H_2O + CO_2 \rightarrow R-NH_3HCO_3$$

In the washing section 142, the flue gas 11B from which $CO_2$ has been removed rises via a chimney tray 145. Then, the flue gas 11B is brought into gas-liquid contact with the cleaning water W2 supplied from the top part side of the washing section 142, and becomes a flue gas 11C from which the $CO_2$-absorbing solution 13 entrained in the flue gas 11B has been recovered by circulation cleaning. The flue gas 11C is exhausted to the outside from a tower top part 14a of the $CO_2$-absorber 14 after mist in the gas is trapped by a mist eliminator 146.

A rich solution supply tube 50 through which the $CO_2$-absorbing solution 13 (rich solution), which has absorbed $CO_2$ in the $CO_2$-absorber 14, is supplied to an upper part side of the $CO_2$-regenerator 15, is provided between a tower bottom part 14b of the $CO_2$-absorber 14 and an upper part of the $CO_2$-regenerator 15. The rich solution supply tube 50 is provided with a rich solvent pump 51 that supplies the $CO_2$-absorbing solution 13 (rich solution), which has absorbed $CO_2$ in the $CO_2$-absorber 14, toward the $CO_2$-regenerator 15, and a rich-lean solution heat exchanger 52 that heats the $CO_2$-absorbing solution 13 (rich solution) that has absorbed $CO_2$, using the $CO_2$-absorbing solution 13 (lean solution) which has been heated with saturated steam and from which $CO_2$ has been removed.

The $CO_2$-regenerator 15 includes a $CO_2$-absorbing solution supply part 151 that is provided at a central part of the $CO_2$-regenerator 15 and has the $CO_2$-absorbing solution 13, which has absorbed $CO_2$, supplied thereto, and a mirror surface part 152 of a tower bottom part 15b of a lower part of the $CO_2$-absorbing solution supply part 151. The tower bottom part 15b of the $CO_2$-regenerator 15 is provided with a circulation line L4 through which the $CO_2$-absorbing solution 13 that has flowed down to the tower bottom part 15b circulates. The circulation line L4 is provided with a regeneration heater 31 that heats the $CO_2$-absorbing solution 13 with saturated steam S.

A tower top part 15a of the $CO_2$-regenerator 15 is provided with a gas exhaust line L5 through which a $CO_2$ gas 41 accompanied by the saturated steam S is exhausted. The gas exhaust line L5 is provided with a condenser 42 that condenses moisture in the $CO_2$ gas 41, and a separation drum 43 that separates the $CO_2$ gas 41 from condensed water W5. The separation drum 43 separates the condensed water W5 from the $CO_2$ gas 41, and releases a $CO_2$ gas 44, from which the condensed water W5 has been separated, from an upper part of the separation drum 43 to the outside. A condensed water line L6 through which the condensed water W5 separated by the separation drum 43 is supplied to the upper part of the $CO_2$-regenerator 15 is provided between a bottom part of the separation drum 43 and the upper part of the $CO_2$-regenerator 15. The condensed water line L6 is provided with a condensed water circulation pump 45 that supplies the condensed water W5 separated by the separation drum 43 to the upper part of the $CO_2$-regenerator 15.

Additionally, the tower bottom part 15b of the $CO_2$-regenerator 15 and an upper part of the $CO_2$ absorption section 141 of the $CO_2$-absorber 14 are provided with a lean solution supply tube 53 through which the $CO_2$-absorbing solution 13 (lean solution) in the tower bottom part 15b of the $CO_2$-regenerator 15 is supplied to the upper part of the $CO_2$ absorption section 141. The lean solution supply tube 53 is provided with the rich-lean solution heat exchanger 52 that heats the $CO_2$-absorbing solution 13 (rich solution), which has absorbed $CO_2$, using the $CO_2$-absorbing solution 13 (lean solution) which has been heated with the saturated steam S and from which $CO_2$ has been removed, a lean solution pump 54 that supplies the $CO_2$-absorbing solution 13 (lean solution) in the tower bottom part 15b of the $CO_2$-regenerator 15 to the upper part of the $CO_2$ absorption section 141, and a quenching section 55 that cools the $CO_2$-absorbing solution 13 (lean solution) to a predetermined temperature.

The $CO_2$ recovery unit 1 in accordance with one or more embodiments includes a flue gas detecting unit 101 that is provided in a flow passage for the flue gas 11A to be introduced into the quencher 12, a $CO_2$ concentration meter 102 that is provided in a flow passage for the flue gas 11C exhausted from $CO_2$-absorber 14, a $CO_2$ gas detecting unit 103 that is provided in a flow passage for the $CO_2$ gas 44 exhausted from the separation drum 43, and a concentration meter 104 that measures the concentration of the $CO_2$-absorbing solution (lean solution) 13 to be supplied to the $CO_2$-absorber 14.

A flue gas detecting unit 101a measures $CO_2$ concentration in the flue gas 11A to be introduced into the quencher 12, and transmits the measured $CO_2$ concentration to a $CO_2$ recovery amount controller 111. Additionally, a flue gas detecting unit 101b measures the gas flow rate and the gas temperature of the flue gas 11A, and transmits the gas flow rate and the gas temperature to the $CO_2$ recovery amount controller 111. The $CO_2$ concentration meter 102 detects $CO_2$ concentration in the flue gas 11C exhausted from the $CO_2$-absorber 14, and transmits the detected $CO_2$ concentration to the $CO_2$ recovery amount controller 111.

The $CO_2$ gas detecting unit 103 detects the gas flow rate and the concentration of the $CO_2$ gas 44 exhausted from the separation drum 43, and transmits the gas flow rate and the concentration to the $CO_2$ recovery amount controller 111. The concentration meter 104 measures the concentration of the $CO_2$-absorbing solution (lean solution) 13 to be supplied to the $CO_2$-absorber 14, and transmits the measured concentration of the $CO_2$-absorbing solution (lean solution) 13 to the $CO_2$ recovery amount controller 111.

The $CO_2$ recovery amount controller 111 calculates a computed target value of the $CO_2$ recovery rate based on a set value of the $CO_2$ recovery rate, actual measured values of the $CO_2$ concentration, gas flow rate, and temperature of the flue gas 11A, and a maximum value of the $CO_2$ recovery amount of the overall device. Additionally, the $CO_2$ recovery amount controller 111 controls the amount of the $CO_2$-absorbing solution 13 supplied to the $CO_2$-absorber 14 and the amount of the $CO_2$-absorbing solution 13 supplied to the $CO_2$-regenerator 15 based on the calculated computed target value of the $CO_2$ recovery rate, and controls the amount of the saturated steam S supplied to the regeneration heater 31 of the $CO_2$-regenerator 15.

Figure 2:
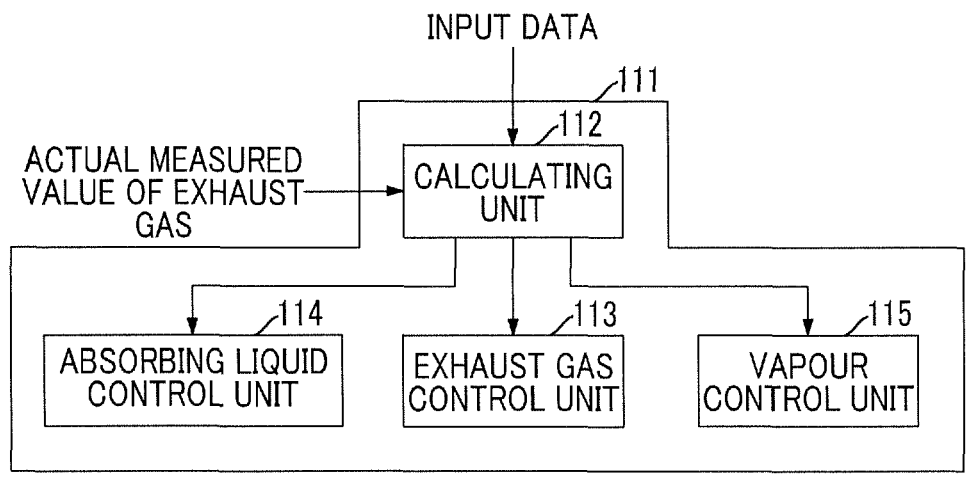
FIG. 2 is a functional block diagram of a $CO_2$ recovery amount controller in accordance with one or more embodiments of the invention.

FIG. 2 is a functional block diagram of the $CO_2$ recovery amount controller 111 in accordance with one or more embodiments of the invention. The $CO_2$ recovery amount controller 111 in accordance with one or more embodiments includes a calculating unit 112, and a flue gas controller 113, an absorbing solution controller 114, and a steam controller 115. The calculating unit 112 calculates the maximum value of the $CO_2$ recovery amount that is determined according to device design conditions and utility conditions of steam or the like and is capable being recovered by the $CO_2$ recovery unit 1. Additionally, the calculating unit 112 calculates a target value of the $CO_2$ recovery amount based on the set value of the $CO_2$ recovery rate that is set in advance, the $CO_2$ concentration in the flue gas 11A measured by the flue gas detecting unit 101a, and an actual measured value of the gas flow rate of the flue gas 11A measured by the flue gas detecting unit 101b. The target value of the $CO_2$ recovery amount is a $CO_2$ recovery amount that is determined based on the set value of the $CO_2$ recovery rate that is set in advance. Moreover, the calculating unit 112 calculates the computed target value of the $CO_2$ recovery amount based on the target value of the $CO_2$ recovery amount and the calculated maximum value of the $CO_2$ recovery amount. The computed target value of the $CO_2$ recovery amount is, for example, any smaller value of the maximum value of the $CO_2$ recovery amount or and the target value of the $CO_2$ recovery amount. Additionally, the calculating unit 112 calculates the computed target value of the $CO_2$ recovery rate based on the calculated computed target value of the $CO_2$ recovery amount, the $CO_2$ concentration in the flue gas 11A, and the actual measured value of the gas flow rate of the flue gas 11A. The computed target value of the $CO_2$ recovery rate is a value of the $CO_2$ recovery rate for realizing a $CO_2$ recovery amount according to actual operation conditions or the like of the $CO_2$ recovery unit 1. Moreover, the calculating unit 112 transmits the calculated computed target values of the $CO_2$ recovery rate and the $CO_2$ recovery amount to the flue gas controller 113, the absorbing solution controller 114, and the steam controller 115.

The calculating unit 112 calculates the computed target value that is the target value of the $CO_2$ recovery rate of the overall device based on various kinds of input data and various actual measured values. In one or more embodiments, the calculating unit 112 calculates the computed target value of the $CO_2$ recovery rate, for example, based on the following Formulas (1) to (3). In addition, □ is any value that is determined depending on design conditions or the like of the $CO_2$ recovery unit.

$$Y1 = X1 \times X2 \times X3 \times \alpha \qquad \text{Formula (1)}$$

$$Y2 = \min(X4, Y1) \qquad \text{Formula (2)}$$

$$Y3 = Y2/(X2 \times X3 \times \alpha) \qquad \text{Formula (3)}$$

(In Formulas (1) to (3), X1 represents the set value of the $CO_2$ recovery rate, X2 represents the actual measured value of the $CO_2$ concentration of the flue gas, X3 represents the actual measured value of the gas flow rate of the flue gas, X4 represents the maximum value of the $CO_2$ recovery amount, Y1 represents the target value of the $CO_2$ recovery amount, Y2 represents the computed target value of the $CO_2$ recovery amount, Y3 represents the computed target value of the $CO_2$ recovery rate, and □ represents a conversion factor).

The flue gas controller 113 controls the flow rate of the flue gas 11A to be introduced into the quencher 12 via a control valve V1 based on the set value and the computed target value of the $CO_2$ recovery rate calculated by the calculating unit 112. The absorbing solution controller 114 controls the liquid volume of the $CO_2$-absorbing solution (lean solution) 13 to be supplied to the $CO_2$-absorber 14 via a control valve V2 based on the set value and the computed target value of the $CO_2$ recovery rate calculated by the calculating unit 112, and controls the liquid volume of the $CO_2$-absorbing solution (rich solution) 13 to be supplied to the $CO_2$-regenerator 15 via a control valve V3. The steam controller 115 controls the flow rate of the saturated steam S to be supplied to the regeneration heater 31 via a control valve V4 based on the set value and the computed target value of the $CO_2$ recovery rate calculated by the calculating unit 112.

In one or more embodiments, the calculating unit 112 calculates the computed target value of the $CO_2$ recovery rate based on the maximum value of the $CO_2$ recovery amount when the target value of the $CO_2$ recovery amount exceeds the maximum value of the $CO_2$ recovery amount, and calculates the computed target value of the $CO_2$ recovery rate based on the target value of the $CO_2$ recovery amount when the target value of the $CO_2$ recovery amount is equal to or lower than the maximum value of the $CO_2$ recovery amount. Accordingly, even when operation conditions, such as the $CO_2$ concentration, gas flow rate, and temperature of the flue gas 11A, fluctuate, and $CO_2$ introduced into $CO_2$ recovery unit 1 has increased, the $CO_2$ recovery unit 1 can be stably operated because the overall device can be controlled based on the set value of the $CO_2$ recovery rate at which the $CO_2$ recovery amount becomes equal to or lower than a maximum value capable of being processed by the overall device. Additionally, when $CO_2$ introduced into the $CO_2$ recovery unit 1 becomes equal to or lower than the maximum value of the $CO_2$ recovery amount, the overall device can be controlled based on the set value of the $CO_2$ recovery rate that is set in advance. Thus, an operational state according to a design can be brought about.

Next, the overall operation of the $CO_2$ recovery unit 1 in accordance with one or more embodiments will be described. The flue gas 11A containing $CO_2$ exhausted from industrial facilities, such as a boiler and a gas turbine, is introduced into the quencher 12, and is brought into countercurrent contact with and cooled by the cooling water W1 after the $CO_2$ concentration, gas flow rate, and temperature in the flue gas 11A are measured by the flue gas detecting unit 101. The cooled flue gas 11A is introduced into the $CO_2$-absorber 14 via a flue 16. The flue gas 11A introduced into the $CO_2$-absorber 14 is brought into countercurrent contact with the $CO_2$-absorbing solution 13 containing alkanolamine or the like in the $CO_2$ absorption section 141, and becomes the flue gas 11B from which $CO_2$ in the flue gas 11A has been absorbed by the $CO_2$-absorbing solution 13 and $CO_2$ has been removed.

The flue gas 11B from which $CO_2$ has been removed rises via the chimney tray 145, is brought into gas-liquid contact with the cleaning water W2 supplied from the top part side of the washing section 142, and becomes the flue gas 11C from which the $CO_2$-absorbing solution 13 entrained in the flue gas 11B has been recovered by circulation cleaning. The $CO_2$ concentration in the flue gas 11C is measured by the $CO_2$ concentration meter 102 and the flue gas 11C is exhausted from the tower top part 14a of the $CO_2$-absorber 14 to the outside, after the mist in the gas is caught by the mist eliminator 146.

The $CO_2$-absorbing solution 13 (rich solution) that has absorbed $CO_2$ is sent to the rich-lean solution heat exchanger 52 by a rich solvent pump 51 via a rich solution supply tube 50 in the $CO_2$-absorber 14. In the rich-lean solution heat exchanger 52, the $CO_2$-absorbing solution 13 (rich solution) sent from the $CO_2$-absorber 14 is heat-exchanged with the $CO_2$-absorbing solution 13 (lean solution) sent from the $CO_2$-regenerator 15. The $CO_2$-absorbing solution 13 (rich solution) after this heat exchange is supplied to the upper part of the $CO_2$-regenerator 15. The $CO_2$-absorbing solution 13 supplied to the $CO_2$-regenerator 15 has $CO_2$ removed therefrom and becomes a semi-lean solution, while flowing down to the tower bottom part 15b via the $CO_2$-absorbing solution supply part 151. This semi-lean solution is circulated through the circulation line L4, is heated by the saturated steam S in the regeneration heater 31, and becomes the $CO_2$-absorbing solution 13 (lean solution). The saturated steam S after being heated becomes the saturated steam condensed water W4. The $CO_2$ gas 41 removed from the $CO_2$-absorbing solution 13 is released to the outside as the $CO_2$ gas 44 from which the condensed water W5 has been separated through the upper part of the separation drum 43 after the moisture thereof is condensed by the condenser 42. As for the $CO_2$ gas 44, $CO_2$ concentration in the $CO_2$ gas 44 is measured by the $CO_2$ gas detecting unit 103.

The $CO_2$-absorbing solution 13 (lean solution) of the tower bottom part 15b of the $CO_2$-regenerator 15 is supplied to the upper part of the $CO_2$ absorption section 141 of the $CO_2$-absorber 14 by the lean solution pump 54 after being heat-exchanged with the $CO_2$-absorbing solution 13 (rich solution) by the rich-lean solution heat exchanger 52 via the lean solution supply tube 53.

Figure 3:
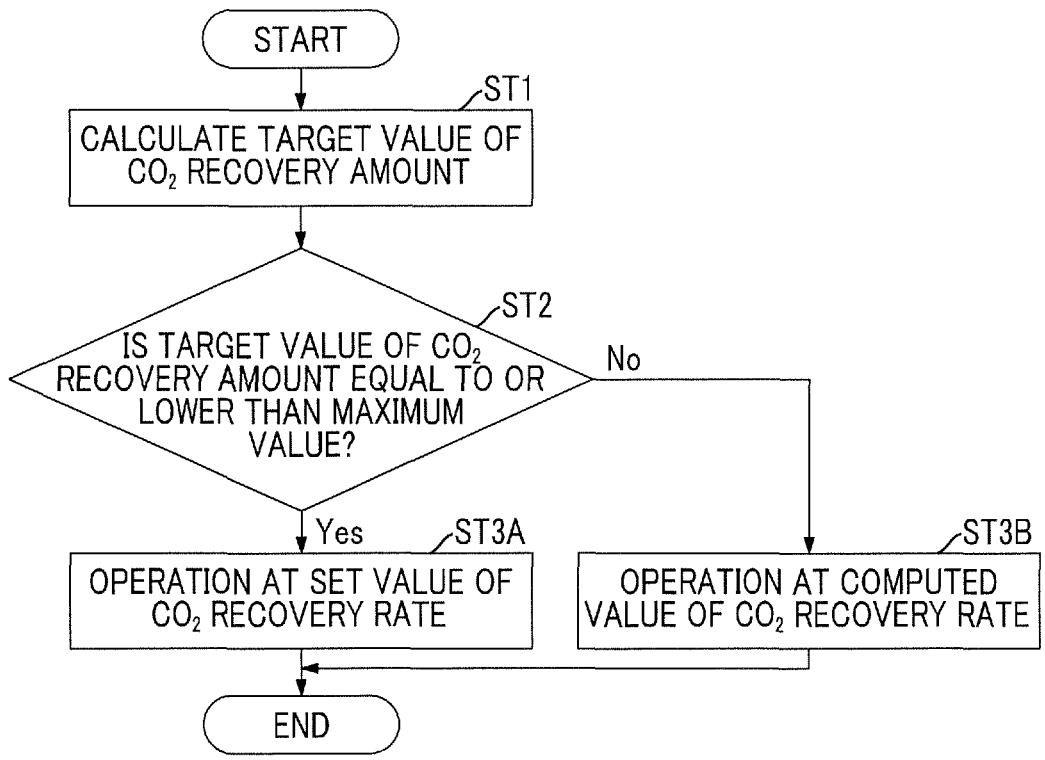
FIG. 3 is a block diagram illustrating operation control using the $CO_2$ recovery amount controller in accordance with one or more embodiments of the invention.

FIG. 3 is a flow chart illustrating operation control using the $CO_2$ recovery amount controller 111 in accordance with one or more embodiments. As illustrated in FIG. 3, the $CO_2$ recovery amount controller 111 calculates the target value of the $CO_2$ recovery amount based on various kinds of input data, such as the $CO_2$ set value that is set in advance, the $CO_2$ concentration in the flue gas 11A, and the flow rate and temperature of the flue gas 11A (Step ST1), and determines whether or not the calculated target value of the $CO_2$ recovery amount is equal to or lower than the maximum value of the $CO_2$ recovery amount (Step ST2). Then, when the target value of the $CO_2$ recovery amount is equal to or lower than the maximum value of the $CO_2$ recovery amount, the $CO_2$ recovery amount controller 111 controls the flow rate of the $CO_2$-absorbing solution 13 and the flow rate of the saturated steam S to be supplied to the regeneration heater 31 via the absorbing solution controller 114 and the steam controller 115, based on the set value of the $CO_2$ recovery rate (Step ST3A). Additionally, when the target value of the $CO_2$ recovery amount exceeds the maximum value of the $CO_2$ recovery amount, the $CO_2$ recovery amount controller 111 controls the flow rate of the $CO_2$-absorbing solution 13 and the flow rate of the saturated steam S to be supplied to the regeneration heater 31 via the absorbing solution controller 114 and the steam controller 115, based on the computed target value of the $CO_2$ recovery rate (Step ST3B).

As described above, according to one or more embodiments, the circulation amount of the $CO_2$-absorbing solution 13 and the amount of the saturated steam S supplied to the regeneration heater 31 can be appropriately controlled according to changes in the target values of the $CO_2$ recovery rate and the $CO_2$ recovery amount in the flue gas 11A. Accordingly, for example, even when there are changes in operation conditions, such as a case where $CO_2$ concentration in flue gas has increased, or even when there is an influence on a predetermined relational expression to be used for operation control and the precision of a measuring instrument due to change of the measuring instrument, or the like, the $CO_2$ recovery unit 1 that can control the $CO_2$ recovery amount and/or the $CO_2$ recovery rate to a target value with high precision can be realized.

In addition, in the above-described embodiments, the $CO_2$ recovery amount controller 111 may continuously monitor the gas flow rate, $CO_2$ concentration, and temperature of the flue gas 11A, thereby calculating the computed target value of the $CO_2$ recovery rate. However, the present invention is not limited to this configuration. For example, the $CO_2$ recovery amount controller 111 may control the $CO_2$ recovery amount to a value equal to or lower than the computed target value of the $CO_2$ recovery amount when the actual measured values of the gas flow rate, $CO_2$ concentration, and temperature of the flue gas 11A exceed predetermined threshold values. By performing such control, for example, even when a malfunction has occurred in measuring instruments, such as a $CO_2$ concentration meter and a gas flowmeter, it is possible to operate the $CO_2$ recovery unit 1 appropriately.

Additionally, in the above-described embodiments, the $CO_2$ recovery amount controller 111 may feedback-control the operation of the overall device using the computed target value of the $CO_2$ recovery amount. By performing such control, the operation of the $CO_2$ recovery unit 1 can be controlled based on the $CO_2$ recovery amount in which the response of numerical fluctuations is quick relative to the $CO_2$ recovery rate. Thus, it is possible to control the operation of the $CO_2$ recovery unit 1 more stably.

In addition, in the above-described embodiments, the flue gas 11A containing $CO_2$ exhausted from industrial facilities, such as a boiler and a gas turbine, is treated by the $CO_2$-absorbing solution 13. However, the gas to be treated is not limited to the flue gas 11A; in other embodiments of the invention, various other gases containing $CO_2$ may be treated by the $CO_2$-absorbing solution 13.

REFERENCE SIGNS LIST

1: $CO_2$ RECOVERY UNIT
11A, 11B, 11C: FLUE GAS
12: QUENCHER
121: QUENCHING SECTION
122: HEAT EXCHANGER
123: CIRCULATION PUMP
13: $CO_2$-absorbing solution
14: $CO_2$-ABSORBER
14a: TOWER TOP PART
14b: TOWER BOTTOM PART
141: $CO_2$ ABSORPTION SECTION
142: WASHING SECTION
144: LIQUID STORAGE SECTION
145: CHIMNEY TRAY
146: MIST ELIMINATOR
15: $CO_2$-regenerator
15a: TOWER TOP PART
15b: TOWER BOTTOM. PART
151: $CO_2$-absorbing solution SUPPLY PART
152: MIRROR SURFACE PART
16: FLUE
21: HEAT EXCHANGER
22: CIRCULATION PUMP
23: CONTROL VALVE
31: REGENERATION HEATER
41, 44: $CO_2$ GAS
42: CONDENSER
43: SEPARATION DRUM
45: CONDENSED WATER CIRCULATION PUMP
50: RICH SOLUTION SUPPLY TUBE
51: RICH SOLVENT PUMP
52: RICH-LEAN SOLUTION HEAT EXCHANGER
53: LEAN SOLUTION SUPPLY TUBE
54: LEAN SOLUTION PUMP
55: QUENCHING SECTION
101a, 101b: FLUE GAS DETECTING UNIT
102: $CO_2$ CONCENTRATION METER
103: $CO_2$ GAS DETECTING UNIT
104: CONCENTRATION METER
111: $CO_2$ RECOVERY AMOUNT CONTROLLER
112: CALCULATING UNIT
113: FLUE GAS CONTROLLER
114: ABSORBING SOLUTION CONTROLLER
115: STEAM CONTROLLER
L1, L2, L4: CIRCULATION LINE
L3: EXTRACTION LINE
L5: GAS EXHAUST LINE
L6: CONDENSED WATER LINE
S: SATURATED STEAM
W1: COOLING WATER
W2, W3: CLEANING WATER
W4: SATURATED STEAM CONDENSED WATER
W5: CONDENSED WATER While the disclosure includes a limited number of embodiments, those skilled in the art, having benefit of this disclosure, will appreciate that other embodiments may be devised which do not depart from the scope of the present disclosure. Accordingly, the scope should be limited only by the attached claims. Further, one of ordinary skill in the art would appreciate that the various "units" disclosed herein may be implemented by software or hardware (e.g., circuit).

What is claimed:
1. A $CO_2$ recovery unit comprising:
a $CO_2$-absorber in which a gas containing $CO_2$ contacts a $CO_2$-absorbing solution that absorbs the $CO_2$ in the gas;
a $CO_2$-regenerator that heats the $CO_2$-absorbing solution that has absorbed the $CO_2$ from the gas, releases the $CO_2$ from the $CO_2$-absorbing solution, and regenerates the $CO_2$-absorbing solution; and
a $CO_2$ recovery amount controller that:
calculates a computed target value of a $CO_2$ recovery amount and a computed target value of a $CO_2$ recovery rate based on a set value of the $CO_2$ recovery rate, actual measured values of $CO_2$ concentration, gas flow rate, and temperature of the gas,
calculates a maximum value of the $CO_2$ recovery amount in the $CO_2$-absorber and a maximum value of the $CO_2$ recovery amount in the $CO_2$-regenerator, and
controls an amount of the $CO_2$-absorbing solution supplied to the $CO_2$-absorber, an amount of the $CO_2$-absorbing solution supplied to the $CO_2$-regenerator, and an amount of saturated steam supplied to a regeneration heater of the $CO_2$-regenerator based on the set value of the $CO_2$ recovery rate or the computed target value of the $CO_2$ recovery rate,
wherein the $CO_2$ recovery amount controller controls the $CO_2$ recovery amount to a value less than or equal to the computed target value of the $CO_2$ recovery amount when any one of the actual measured values of the $CO_2$ concentration, gas flow rate, and temperature of the gas exceeds a predetermined threshold value.

2. The $CO_2$ recovery unit according to claim 1,
wherein the $CO_2$ recovery amount controller calculates the computed target value of the $CO_2$ recovery rate based on the following formulas (1) to (3):

$$Y1 = X1 \times X2 \times X3 \times \alpha \quad \text{Formula (1)}$$

$$Y2 = \min(X4, Y1) \quad \text{Formula (2)}$$

$$Y3 = Y2/(X2 \times X3 \times \alpha) \quad \text{Formula (3)}$$

wherein, X1 represents the set value of the $CO_2$ recovery rate, X2 represents an actual measured value of the $CO_2$ concentration of the gas, X3 represents an actual measured value of the gas flow rate of the gas, X4 represents a maximum value of the $CO_2$ recovery amount, Y1 represents a target value of the $CO_2$ recovery amount, Y2 represents a computed target value of the $CO_2$ recovery amount, Y3 represents a computed target value of the $CO_2$ recovery rate, and a represents a conversion factor.

3. The $CO_2$ recovery unit according to claim 1,
wherein the $CO_2$ recovery amount controller:
calculates the computed target value of the $CO_2$ recovery rate based on the maximum value of the $CO_2$ recovery amount when a target value of the $CO_2$ recovery amount exceeds a maximum value of the $CO_2$ recovery amount, and
calculates the computed target value of the $CO_2$ recovery rate based on the calculated target value of the $CO_2$ recovery amount when the target value of the $CO_2$ recovery amount is less than or equal to the maximum value of the $CO_2$ recovery amount.

4. The $CO_2$ recovery unit according to claim 1,
wherein the $CO_2$ recovery amount controller feedback-controls an operation of the $CO_2$ recovery unit using the computed target value of the $CO_2$ recovery amount.

5. A CO$_2$ recovery method comprising: causing a gas containing CO$_2$ to contact a CO$_2$-absorbing solution that absorbs the CO$_2$ in the gas in a CO$_2$-absorber; heating the CO$_2$-absorbing solution that has absorbed CO$_2$ from the gas, releasing the CO$_2$ from the CO$_2$-absorbing solution, and regenerating the CO$_2$-absorbing solution in a CO$_2$-regenerator; calculating a computed target value of a CO$_2$ recovery amount and a computed target value of a CO$_2$ recovery rate based on a set value of the CO$_2$ recovery rate, actual measured values of CO$_2$ concentration, gas flow rate, and temperature of the gas with a CO$_2$ recovery amount controller; calculating a maximum value of the CO$_2$ recovery amount in the CO$_2$-absorber and a maximum value of the CO$_2$ recovery amount in the CO$_2$-regenerator with the CO$_2$ recovery amount controller; and controlling an amount of the CO$_2$-absorbing solution supplied to the CO$_2$-absorber, an amount of the CO$_2$-absorbing solution supplied to the CO$_2$ regenerator, and an amount of saturated steam supplied to a regeneration heater of the CO$_2$-regenerator based on the set value of the CO$_2$ recovery rate or the computed target value of the CO$_2$ recovery rate with the CO$_2$ recovery amount controller; and wherein the CO$_2$ recovery amount is controlled to a value less than or equal to the computed target value of the CO$_2$ recovery amount when any one of the actual measured values of the CO$_2$ concentration, gas flow rate, and temperature of the gas exceeds a predetermined threshold value.

6. The CO$_2$ recovery method according to claim 5, wherein the computed target value of the CO$_2$ recovery rate is calculated based on the following formulas (1) to (3):

$$Y1 = X1 \times X2 \times X3 \times \alpha \qquad \text{Formula (1)}$$

$$Y2 = \min(X4, Y1) \qquad \text{Formula (2)}$$

$$Y3 = Y2/(X2 \times X3 \times \alpha) \qquad \text{Formula (3)}$$

wherein, X1 represents the set value of the CO$_2$ recovery rate, X2 represents an actual measured value of the CO$_2$ concentration of the gas, X3 represents an actual measured value of the gas flow rate of the gas to be treated, X4 represents a maximum value of the CO$_2$ recovery amount, Y1 represents a target value of the CO$_2$ recovery amount, Y2 represents a computed target value of the CO$_2$ recovery amount, Y3 represents a computed target value of the CO$_2$ recovery rate, and α represents a conversion factor.

7. The CO$_2$ recovery method according to claim 5, wherein the computed target value of the CO$_2$ recovery rate is calculated based on a maximum value of the CO$_2$ recovery amount when a target value of the CO$_2$ recovery amount exceeds a maximum value of the CO$_2$ recovery amount; and the computed target value of the CO$_2$ recovery rate is calculated based on the target value of the CO$_2$ recovery amount when the target value of the CO$_2$ recovery amount is less than or equal to the maximum value of the CO$_2$ recovery amount.

8. The CO$_2$ recovery method according to claim 5, wherein the method is performed by a CO$_2$ recovery unit and the method further comprises feedback-controlling an operation of the CO$_2$ recovery unit using the computed target value of the CO$_2$ recovery amount.

* * * * *